United States Patent
Lee et al.

(10) Patent No.: US 10,061,784 B2
(45) Date of Patent: Aug. 28, 2018

(54) METHOD AND DEVICE FOR FUSING A PLURALITY OF UNCERTAIN OR CORRELATED DATA

(71) Applicant: RESEARCH & BUSINESS FOUNDATION SUNGKYUNKWAN UNIVERSITY, Suwon-si (KR)

(72) Inventors: Suk Han Lee, Yongin-si (KR); Abu Bakr Muhammad, Suwon-si (KR)

(73) Assignee: Research & Business Foundation Sungkyunkwan University, Suwon-si (KR)

(*) Notice: Subject to any disclaimer, the term of this patent is extended or adjusted under 35 U.S.C. 154(b) by 64 days.

(21) Appl. No.: 15/135,976

(22) Filed: Apr. 22, 2016

(65) Prior Publication Data

US 2016/0314574 A1    Oct. 27, 2016

(30) Foreign Application Priority Data

Apr. 24, 2015    (KR) .................. 10-2015-0058160

(51) Int. Cl.
*G06F 17/30* (2006.01)
*G06T 3/40* (2006.01)
*H04N 1/387* (2006.01)

(52) U.S. Cl.
CPC ........ *G06F 17/3028* (2013.01); *G06T 3/4038* (2013.01); *H04N 1/3876* (2013.01);
(Continued)

(58) Field of Classification Search
CPC .......... G06F 17/3028; B60R 2300/303; G06T 2207/20216; G06T 2207/20212;
(Continued)

(56) References Cited

U.S. PATENT DOCUMENTS 5,319,636 A * 6/1994 Long ............... H04B 3/235
                                                     370/291
6,110,115 A * 8/2000 Ustuner ........... G01S 7/52046
                                                     600/443

(Continued)

FOREIGN PATENT DOCUMENTS

| JP | 2013-92980 A | 5/2013 |
| KR | 10-2011-0030639 A | 3/2011 |
| KR | 10-2014-0090296 A | 7/2014 |

OTHER PUBLICATIONS

Korean Notice of Allowance dated Nov. 25, 2016 in counterpart Korean Patent Application No. 10-2015-0058160 (5 pages, in Korean).

(Continued)

*Primary Examiner* — Manav Seth
(74) *Attorney, Agent, or Firm* — NSIP Law

(57) ABSTRACT

Provided is a method for fusing a plurality of data, this method comprising inputting a plurality of N-dimensional uncertain data where N is a natural number not being a zero, representing the inputted plurality of uncertain data in a first form of a data set in a 2N-dimensional extended space, generating a second form of a data set by applying whitening transform WT to the 2N-dimensional extended space, acquiring a first point or first vector through a linear projection to a transformed constraint manifold from the second form of the data set and generating a N-dimensional fused data by applying inverse-whitening transform to the first point or first vector.

18 Claims, 7 Drawing Sheets

(52) U.S. Cl.
CPC .............. *B60R 2300/303* (2013.01); *G06T 2207/20221* (2013.01)

(58) Field of Classification Search
CPC . G06T 2207/20221; G06T 2207/20224; G06T 3/4038; H04N 1/3876
See application file for complete search history.

(56) References Cited

U.S. PATENT DOCUMENTS

| | | | |
|---|---|---|---|
| 7,424,074 B2 * | 9/2008 | Lee .................. | G11B 20/10009 375/263 |
| 8,737,501 B2 * | 5/2014 | Shah .................... | H04B 7/0854 375/267 |
| 8,948,312 B2 * | 2/2015 | Daneshrad ........... | H04B 1/7102 375/260 |
| 2011/0199298 A1 | 8/2011 | Bassompiere et al. | |
| 2014/0180599 A1 | 6/2014 | Lee et al. | |

OTHER PUBLICATIONS

Lee, Jeong-Wook, et al. "A Generalized Subspace Approach for Enhancing Speech Corrupted by Colored Noise Using Whitening Transformation." *Journal of the Korea Institute of Information and Communication Engineering* 15.8 (2011): 1665-1674. (11 pages, in Korean with English abstract).

* cited by examiner (a)

(b)

(c)

METHOD AND DEVICE FOR FUSING A PLURALITY OF UNCERTAIN OR CORRELATED DATA

CROSS-REFERENCE TO RELATED APPLICATIONS

This application claims the benefit of priority of Korean Patent Application No. 10-2015-0058160 filed on Apr. 24, 2015, all of which are incorporated by reference in their entirety herein.

BACKGROUND OF THE INVENTION

Field of the Invention

The present invention relates to a method and device for fusing a plurality of data, and, more particularly to a method and device for fusing a plurality of uncertain or correlated data to acquire a single optimal data.

Related Art

Data integration or fusion may refer to a technique to integrate or fuse a plurality of redundant data provided from a single data measurement sensor or a plurality of data measurement sensors respectively to acquire a single optimal and more certain data. For example, the plurality of redundant data may be measured by a single sensor sequentially or may be measured by a plurality of sensors respectively at the same time. This data fusion technique has been widely employed in a variety of fields, for example, including mobile robot engineering, estimation & tracking, remote sensing, automation, medical imaging, and wireless sensor networking fields. This data fusion technique may employ various different methods such as maximum likelihood, Kalman filter, fuzzy logic and covariance-based methods.

Specifically, the covariance-based method may be classified into a covariance union based method and a covariance intersection based method. The covariance-based method merges different covariance values using complicated combinations of weighted estimations. Therefore, in this method, a nonlinear cost function should be optimized, and repetitive operations are required, leading to a high operation complexity. Further, if two estimations with the same covariance matrix are taken into account, the above method may have a difficulty in use.

The conventional technique, for example, the Kalman filter may not be applied to a case in which there is correlation between the plurality of data, the technique. Otherwise, if applied, it will result in inconsistent estimate of the fused mean and covariance.

SUMMARY OF THE INVENTION

From consideration of the above problems, some embodiments of the present invention provide a data fusion method by which, when a plurality of data is correlated, unlike the covariance intersection, a single optimal data is rapidly and accurately acquired without the repetitive operations by using a closed operation form once.

In one aspect, the present invention provides a method for fusing a plurality of data. This method may comprise inputting a plurality of N-dimensional uncertain data where N is a natural number not being a zero, representing the inputted plurality of uncertain data in a first form of a data set in a 2N-dimensional extended space, generating a second form of a data set by applying whitening transform WT to the 2N-dimensional extended space, acquiring a first point or first vector through a linear projection to a transformed constraint manifold from the second form of the data set and generating a N-dimensional fused data by applying inverse-whitening transform to the first point or first vector.

In one embodiment, the first point or first vector may be a point or vector to allow an Euclidean distance between a center point of the second form of the data set and a point on the transformed constraint manifold to be minimum.

In one embodiment, each of the plurality of data may include a mean value and covariance value of measurement data from the plurality of sensors.

In one embodiment, the first form of the data set may be an elliptical data set formed using the mean values and covariance values of the plurality of data.

In one embodiment, the second form of the data set may be a circular data set.

In one embodiment, the plurality of uncertain data may be a plurality of measurement data obtained respectively by a plurality of different measurement sources to measure the same value.

In one embodiment, the first vector may be a mean vector of the fused data.

In one embodiment, the method may further comprise calculating a combined covariance value of the fused data using intersection data between the first form of the data set and the projected transformed constraint manifold.

In another aspect, the present invention provides a device for fusing a plurality of data. This device may comprise a data input module configured to input a plurality of N-dimensional uncertain data where N is a natural number not being a zero, a data representation module configured to represent the inputted plurality of uncertain data in a first form of a data set in a 2N-dimensional extended space, a whitening transform module configured to generate a second form of a data set by applying whitening transform WT to the 2N-dimensional extended space, a projection module configured to acquire a first point or first vector through a linear projection to a transformed constraint manifold from the second form of the data set and an inverse-whitening transform module configured to generate a N-dimensional fused data by applying inverse-whitening transform to the first point or first vector.

In still another aspect, the present invention provides a method of producing a single fused data from at least three images data. The method may comprise generating first estimated data for a movement of a device, based on a first image sensed from the device at a first state and a second image sensed from the device at a second state, the states including positions and rotation angles of the device, generating second estimated data for a movement of the device based on the second image and a third image sensed from the device at a third state, generating third estimated data for a movement of the device from a first position to a third position, using the first and second estimated data, generating fourth estimated data for a movement of the device based on the first and third images and calculating a fused data between the third and fourth estimated data. The producing of the fused data comprises representing the third and fourth estimated data in a first form of a data set in a 2N-dimensional extended space, generating a second form of a data set by applying whitening transform WT to the 2N-dimensional extended space, acquiring a first point or first vector through a linear projection to a transformed constraint manifold from the second form of the data set and generating a N-dimensional fused data by applying inverse-whitening transform to the first point or first vector.

In one embodiment, the first estimated data, the second estimated data and the fourth estimated data may be estimated using a visual odometry (VO).

In one embodiment, the first point or first vector may be a point or vector to allow an Euclidean distance between a center point of the second form of the data set and a point on the transformed constraint manifold to be minimum.

In one embodiment, each of the third and fourth estimated data may include a mean value and covariance value.

In one embodiment, the first form of the data set may be an elliptical data set using the mean values and covariance values of the third and fourth estimated data.

In one embodiment, the second form of the data set may be a circular data set.

In one embodiment, the first vector may be a mean vector of the fused data.

In one embodiment, the method may further comprise calculating a combined covariance value of the fused data using intersection data between the first form of the data set and the projected transformed constraint manifold.

In yet still another aspect, the present invention provides a device for producing a single fused data from at least three images data. The device may comprise a first estimated data generation module configured to generate first estimated data for a movement of a device, based on a first image sensed from the device at a first state and a second image sensed from the device at a second state, the states including positions and rotation angles of the device, a second estimated data generation module configured to generate second estimated data for a movement of the device based on the second image and a third image sensed from the device at a third state, a third estimated data generation module configured to generate third estimated data for a movement of the device from a first position to a third position, using the first and second estimated data, a fourth estimated data generation module configured to generate fourth estimated data for a movement of the device based on the first and third images and a data fusing module configured to calculate a fused data between the third and fourth estimated data. The data fusing module comprises a data representation sub-module configured to represent the third and fourth estimated data in a first form of a data set in a 2N-dimensional extended space, a whitening transform sub-module configured to generate a second form of a data set by applying whitening transform WT to the 2N-dimensional extended space, a projection sub-module configured to acquire a first point or first vector through a linear projection to a transformed constraint manifold from the second form of the data set and an inverse-whitening transform sub-module configured to generate a N-dimensional fused data by applying inverse-whitening transform to the first point or first vector.

In accordance with the present invention, the redundant data may be easily and accurately fused into a single fused data. Thus, the present data fusing technique may be applied to a variety of technique fields including mobile robot, remote sensing, automation, medical imaging, and wireless sensor networking fields.

DESCRIPTION OF EXEMPLARY EMBODIMENTS

Figure 1:
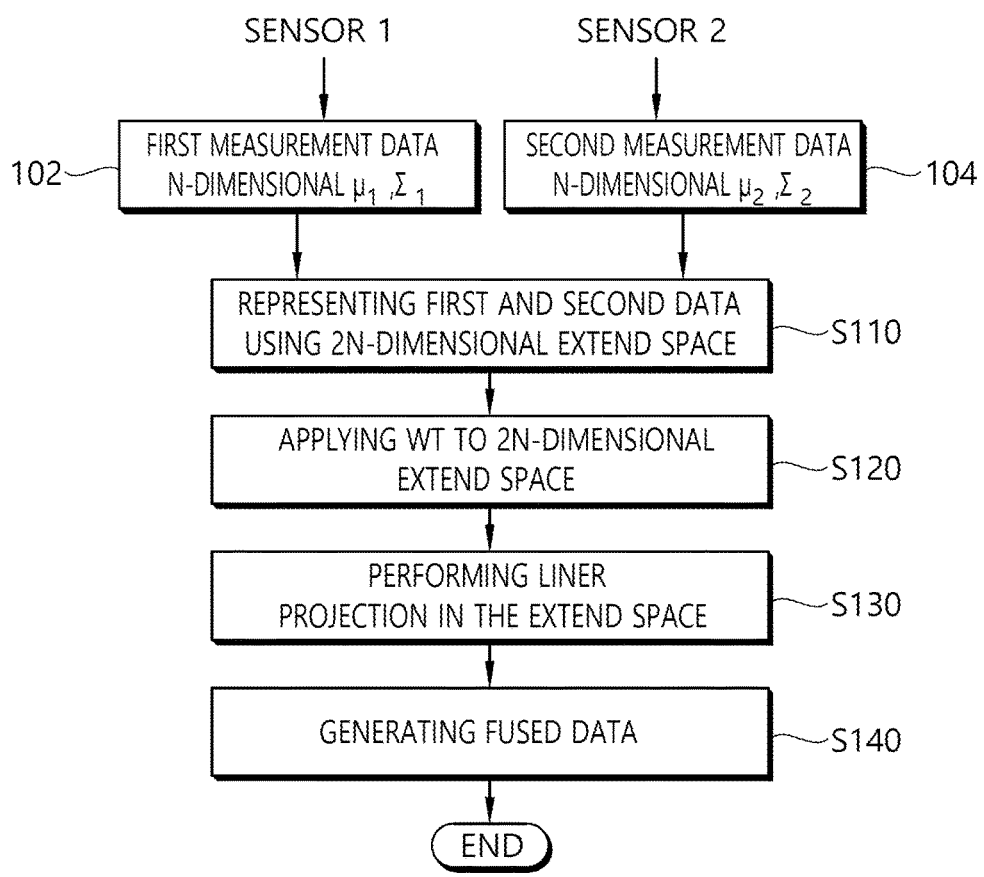
FIG. 1 illustrates a flow chart of a method for fusing a plurality of data in accordance with one embodiment of the present invention.

Examples of various embodiments are illustrated in the accompanying drawings and described further below. It will be understood that the description herein is not intended to limit the claims to the specific embodiments described. On the contrary, it is intended to cover alternatives, modifications, and equivalents as may be included within the spirit and scope of the present invention as defined by the appended claims.

Example embodiments will be described in more detail with reference to the accompanying drawings. The present invention, however, may be embodied in various different forms, and should not be construed as being limited to only the illustrated embodiments herein. Rather, these embodiments are provided as examples so that this invention will be thorough and complete, and will fully convey the aspects and features of the present invention to those skilled in the art.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

It will be understood that when an element or layer is referred to as being "connected to", or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present invention. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, s, operations, elements, and/or components, but do not preclude the presence or addition of one or more other features, integers, s, operations, elements, components, and/or portions thereof.

As used herein, the term "and/or" includes any and all combinations of one or more of the associated listed items. Expressions such as "at least one of" when preceding a list of elements may modify the entire list of elements and may not modify the individual elements of the list.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In the following description, numerous specific details are set forth in order to provide a thorough understanding of the present invention. The present invention may be practiced without some or all of these specific details. In other instances, well-known process structures and/or processes have not been described in detail in order not to unnecessarily obscure the present invention.

FIG. 1 illustrates a flow chart of a method for fusing a plurality of data in accordance with one embodiment of the present invention.

Referring to FIG. 1, a data fusing device (not shown) may be configured to receive, for example, two measurement data 102 and 104 from a plurality of sensors. The measurement data 102 and 104 may include at least two uncertain redundant data indicating, for example, a distance, height, etc. for the same measurement object. The uncertain redundant data may be defined using a single fused data, and uncertainty levels thereof. Each of the measurement data 102 and 104 may include a mean value of multiple measurement data from a single sensor, and a covariance value thereof. Such mean and covariance values may indicate an estimation for an actual state of the measurement object. Each of the measurement data 102 and 104 may refer to a N-dimensional data, where N is a natural number being not zero. For example, N may be 1, 2 or 3. That is, the N-dimensional data may indicate a single point respectively in one, two, or three dimensional space.

Such values for the uncertain measurement data 102 and 104 is inputted into the present data fusing device. Then, the data fusing device may represent the measurement data 102 and 104 in a 2N-dimensional extended space S110. This will be described in details with reference to FIG. 2.

Figure 2:
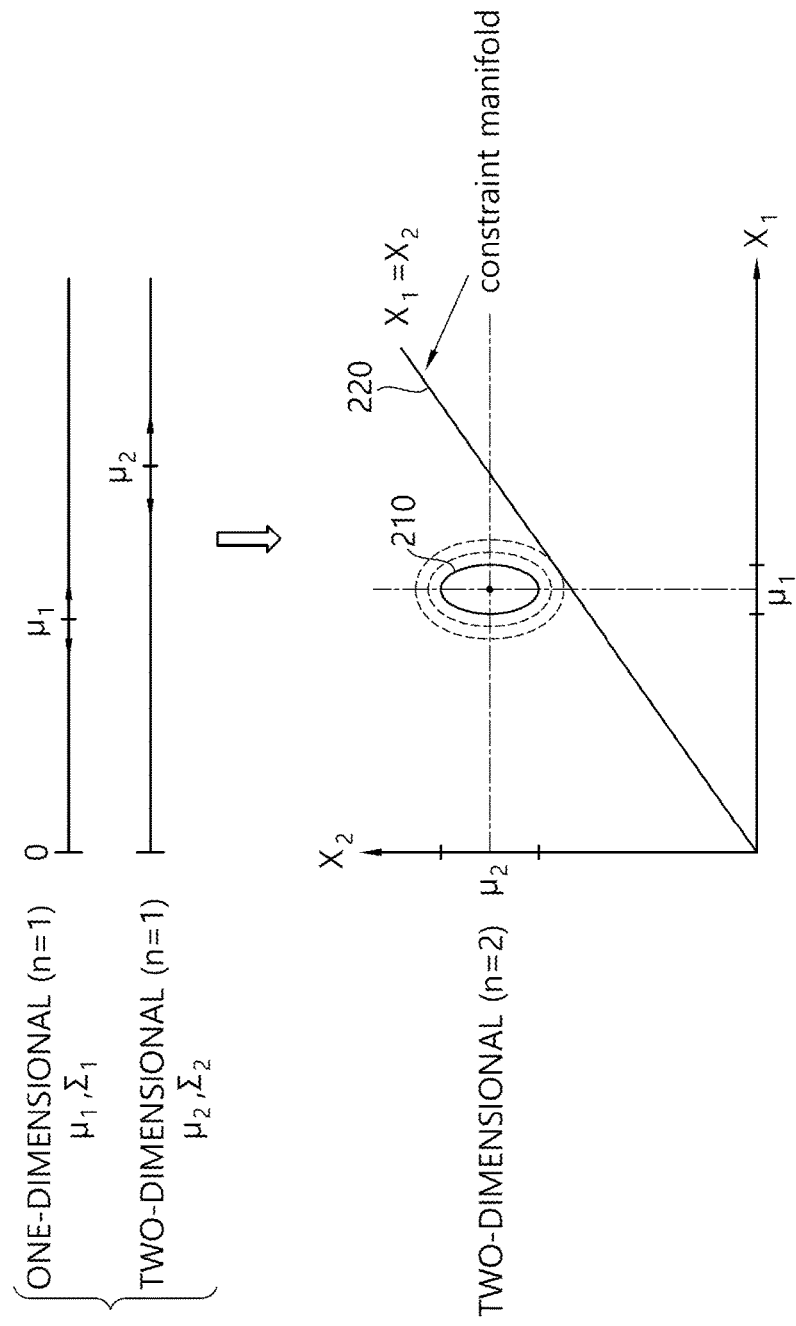
FIG. 2 illustrates a schematic diagram for describing a method of representing one-dimensional input data in a two-dimensional data space in a data fusing method in accordance with one embodiment of the present invention a plurality of data.

FIG. 2 illustrates a schematic diagram for describing a method of representing one-dimensional input data in a two-dimensional data space in a data fusing method in accordance with one embodiment of the present invention a plurality of data.

Referring to an upper portion of FIG. 2, the measurement data may refer to one-dimensional data (N=1). A first measurement data may be defined using $\mu_1$ and $\Sigma_1$, while the second measurement data may be defined $\mu_2$ and $\Sigma_2$, where $\mu$ refers to a mean value, and $\Sigma$ refers to a covariance value. Thus, by mapping such data values, each measurement data may be represented, as shown in the upper portion of FIG. 2, as a liner portion having a center as the mean value, and a length as the covariance value. For example, at least two-dimensional data may be represented as $x_1=(\mu_1, \Sigma_1)$ and $x_2=(\mu_2, \Sigma_2)$.

A lower portion of FIG. 2 shows a mapping of the first and second one-dimensional data into a 2N (N=1), i.e., two-dimensional data space. As shown in the lower portion of FIG. 2, the two-dimensional data space may be defined, for example, as a horizontal $x_1$ axis and a vertical $x_2$ axis. In this two-dimensional space, a combination of the first and second measurement data may be represented as an elliptical data set 210 which has a center point as a coordinate (the mean point $\mu_1$ of the first data, the mean point $\mu_2$ of the second data 2) and has a height as the covariance value of the first data, and has a width as the covariance value of the second data. In this extended space, measurements may be improved using a redundancy of the data set 210. In this connection, the mean value of N dimensional data may be expressed in 2N dimensional space $\mu_k=[\mu_1, \mu_2, \ldots, \mu_n]^T$, and the covariance value may be expressed as $$\Sigma_k = \begin{bmatrix} \Sigma_1 & \cdots & \Sigma_{1n} \\ \vdots & \ddots & \vdots \\ \Sigma_{n1} & \cdots & \Sigma_{nn} \end{bmatrix}$$

where $\Sigma_{nn}$ refers to the cross-covariance between the pluralities of data. In this connection, when n is 1, the data set may be an ellipse in 2 dimensions. In this connection, when n is 3, the data set may have a hyper-ellipsoid form in 6 dimensions. This may be described in details below with reference to FIG. 4.

Referring back to the lower portion of FIG. 2, this elliptical data set 210 should, in principle, meet a constraint manifold 220. In this connection, the constraint manifold 220 may be a manifold 220 of $x_1=x_2$ in the two-dimensional extended space, provided that the first and second data refer to the same measurement data. The constraint manifold 220 in at least three-dimensional space may be represented as a following expression (2):

$$[x_1, y_1, z_1]^T - [x_2, y_2, z_2]^T = 0.$$

Thus, calculating an optimal fused data may correspond to finding out a closest point on the constraint manifold 220 to a center of the elliptical data set 210. To this end, as extending the elliptical data set 210 from the center gradually, there is discovered a contact point between the elliptical data set 210 and the constraint manifold 220. This contact point may mean the closest point on the constraint manifold 220 to the center of the elliptical data set 210. However, the extending process of the elliptical data set 210 may have a high operation complexity and thus poor efficiency.

Therefore, referring back to the lower portion of FIG. 2, the present data fusing device may be configured to represent the elliptical data set 210 in the 2N-dimensional space. Thereafter, the present data fusing device may be configured to apply whitening transform (WT) in the extended space S120. The whitening transform may refer to a linear transform method to transform a data set with a certain covariance to a set of uncorrelated data and a unit covariance. When applying the whitening transform, the elliptical data set is transformed to a circular data set, and the constraint manifold is transformed to a transformed constraint manifold as described later. Then, the circular data set is linear-projected onto the transformed constraint manifold to find out an optimal solution S130. That is, a closest point on the transformed constraint manifold to a center of the circular data set may be defined as the optimal solution. To this end, a line is drawn from the center of the circular data set to the transformed constraint manifold such the line forms a right angle with the transformed constraint manifold. This will be described below in details with reference to FIG. 3.

Figure 3:
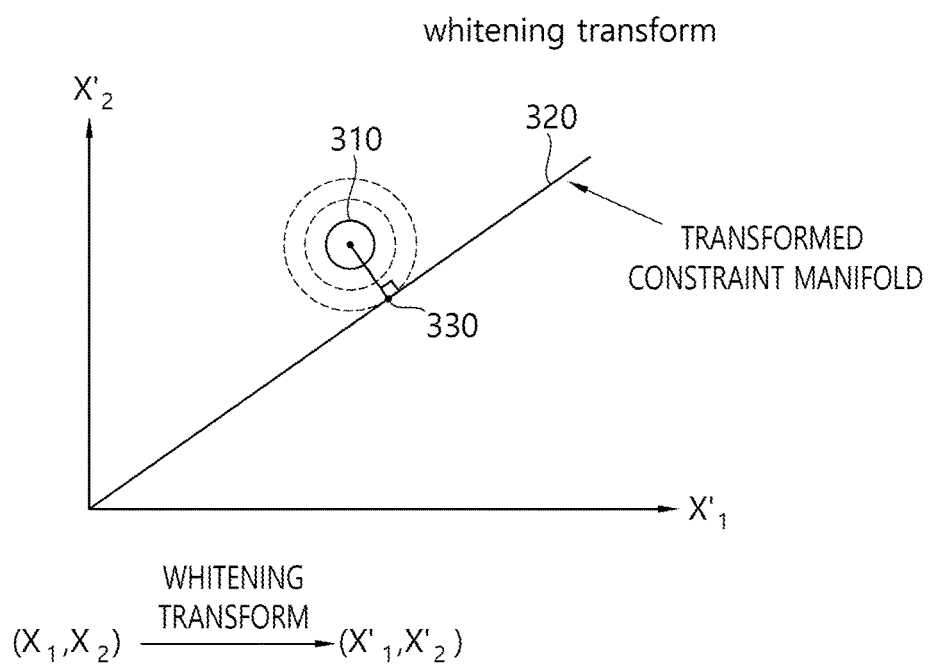
FIG. 3 illustrates a schematic diagram for describing a method for applying whitening transform to an representation in a two-dimensional data space, and applying linear projection to the transformed representation in a data fusing method in accordance with one embodiment of the present invention.

FIG. 3 illustrates a schematic diagram for describing a method for applying whitening transform to a representation in a two-dimensional data space, and applying linear projection to the transformed representation in a data fusing method in accordance with one embodiment of the present invention.

Referring to FIG. 3, when applying the whitening transform, the two-dimensional space having the $x_1$ axis and $x_2$ axis may be transformed to a new two-dimensional space having a $x_1'$ axis and $x_2'$ axis. In this connection, the elliptical data set 210 may be transformed to the circular data set 310, and the constraint manifold 220 may be transformed to the transformed constraint manifold 320.

In this way, when the elliptical data set 210 has been transformed to the circular data set 310, the closest point on the constraint manifold 320 to the center of the circular data set 310 may be easily found out. To this end, as extending the circular data set 310 from the center thereof gradually, there is discovered a first contact point between the circular data set 310 and the constraint manifold 320. This contact point may refer to the closest point. This point may be defined as an optimal solution or point 330. That is, the center of the circular data set 310 may be projected onto the transformed constraint manifold 320 to find out the projected point as the closest point, and covariance around this point and, thus, the optimal solution or point 330.

Referring back to FIG. 3, after finding out the optimal solution or point 330 in the transformed extended space, the transformed extended space may be subjected to inverse-whitening transform to return to the previous 2N-dimensional extended space. Thereafter, the 2N-dimensional extended space may be transformed to the N-dimensional space. In this way, a final fused data may be acquired in the N-dimensional space S140.

Figure 4:
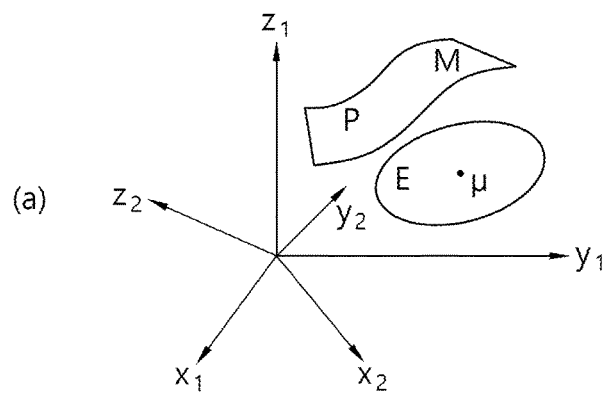
FIG. 4 illustrates schematic diagrams for describing a method for fusing a plurality of three-dimensional data in accordance with one embodiment of the present invention.
Figure 4:
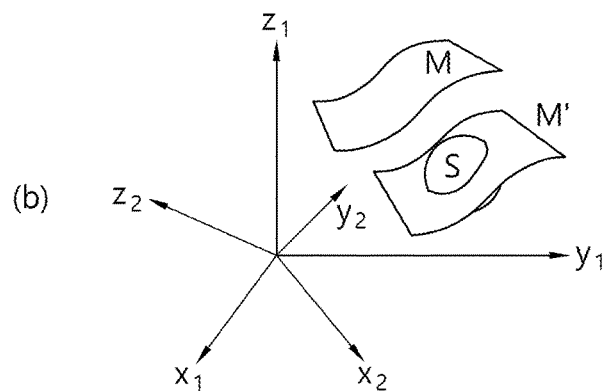
Figure 4:
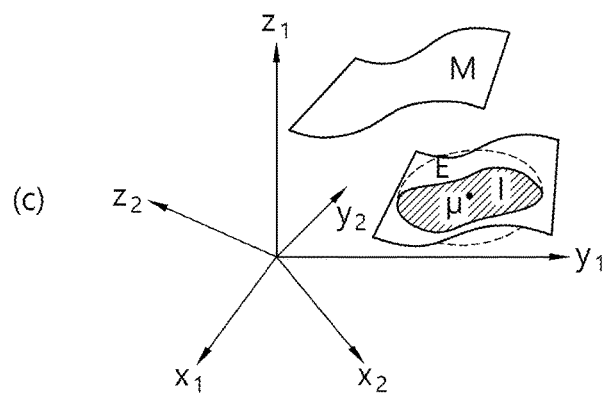

FIG. 4 illustrates schematic diagrams for describing a method for fusing a plurality of three-dimensional data in accordance with one embodiment of the present invention.

Referring to FIG. 4(a), measurement data to be fused are not one-dimensional data but are three-dimensional data, each data having a coordinate (x, y, z). The present invention may be applied for fusing a plurality of the N-dimensional measurement data. In accordance with the present invention, in order to fuse the plurality of three-dimensional data, a six-dimensional extended space is required. In this connection, it may be assumed that there are two estimations $\mu_1=[\pi_1, \beta_1, \gamma_1]$ and $\Sigma_1$, and $\mu_2=[\alpha_2, \beta_2, \gamma_2]$ and $\Sigma_2$ for actual state data $\mu$ and $\Sigma$. Then, the two estimations may be fused. Each of the two estimations may have an uncertainty level which may be represented using a three-dimensional ellipsoid having a mean vector around the ellipsoid. As mentioned above, in order to fuse the two estimations, the six-dimensional extended space having $x_1, x_2, y_1, y_2, z_1$ and $z_2$ axes may be required.

When the data fusing device receives the two estimations, the fusing device is configured to generate a hyper-ellipsoid E on the six-dimensional extended space. Thereafter, as mentioned above, the fusing device is configured to generate a manifold M of $[x_1, y_1, z_1]^T - [x_2, y_2, z_2]^T = 0$. In this connection, in order to find out a fused optimal solution, a value to allow a SMD (Square Mahalanobis Distance) between the hyper-ellipsoid E and the specific point P on the linear manifold M to be minimum should be discovered.

In accordance with one embodiment of the present invention, via the whitening transform, as shown in FIG. 4(b), the hyper-ellipsoid E may be transformed to a hyper-sphere S. Further, the manifold M may be transformed to a manifold M' in a new transformed space. In accordance with one embodiment of the present invention, the hyper-sphere S may be projected onto the manifold M' to find out the optimal solution in the extended space.

This optimal mean vector and optimal fused covariance for the fused ellipsoid may be subjected to inverse-whitening transform to acquire a transformed vector in the space prior to the whitening transform.

Referring FIG. 4(c), when projecting the hyper-ellipsoid E onto the manifold M, an intersection between the hyper-ellipsoid E and the manifold M may be an error bound.

In this way, the optimal solution for the fused data between the plurality of three-dimensional data may be produced as the above mean vector and the combined covariance value.

Figure 5:
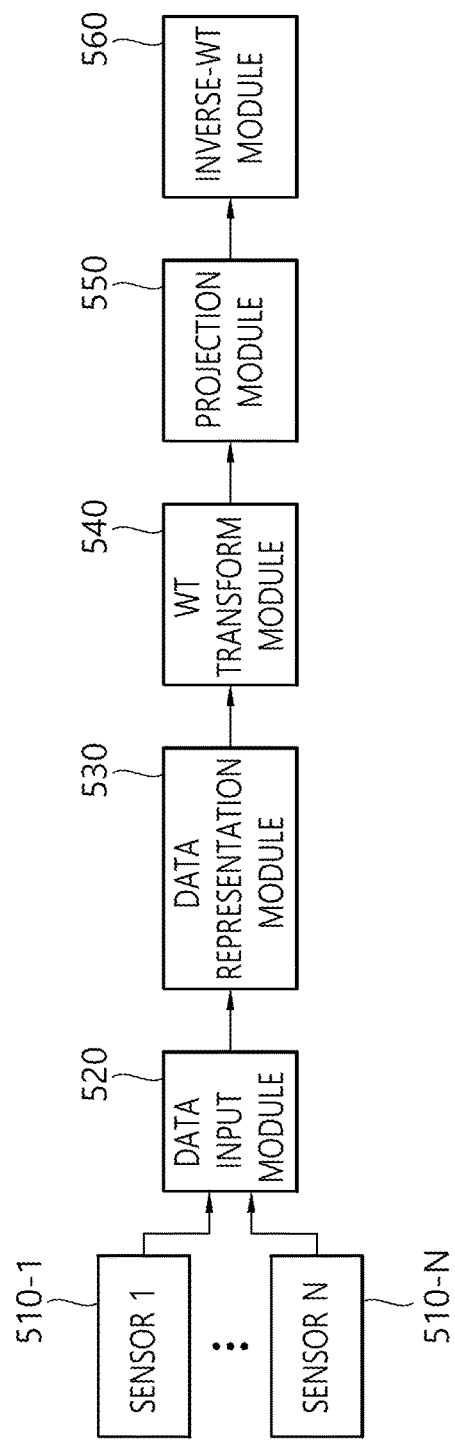
FIG. 5 illustrates a block diagram of a data fusing device for fusing a plurality of data in accordance with one embodiment of the present invention.

FIG. 5 illustrates a block diagram of a data fusing device for fusing a plurality of data in accordance with one embodiment of the present invention. As shown in FIG. 5, the data fusing device in accordance with one embodiment of the present invention data fuse device may include a plurality of sensors 510-1 to 510-N, a data input module 520, a data representation module 530, a whitening transform module 540, a projection module 550 and an inverse-whitening transform module 560.

The plurality of sensors 510-1 to 510-N may be configured to measure and acquire a plurality of N-dimensional data respectively. In this connection, the plurality of sensors 510-1 to 510-N may be configured to sense the same value such as the same height, distance, etc. to acquire the plurality of measurement data respectively.

The data input module 520 may be configured to input the plurality of the measurement data from the plurality of sensor 510-1 to 510-N respectively.

The data representation module 530 may be configured to represent the measurement data in a 2N-dimensional extended space. This may be performed using a mean value and a covariance value of each data. For example, the representation of the two measurement data in the 2-dimensional extended space may be defined as an elliptical data set having a center point consist of the mean values and having a height as the covariance value of one data, and having a width as the covariance value of the other data. As mentioned above, when the measurement data is three-dimensional, the representation of the data on the extend space may be defined as the hyper-ellipsoid data set. The data representation module 530 may be further configured to the constraint manifold in the 2N-dimensional extended space.

The whitening transform module 540 may be configured to apply whitening transform to the extended space. By the whitening transform, the elliptical data set may be transformed to the circular or spherical data set, and the constraint manifold may be transformed based on characteristic of the space. In this way, the circular or spherical data set and the transformed constraint manifold are acquired, which are employed to easily find out the optimal solution.

The projection module 550 may be configured to project the circular or spherical data set onto the transformed constraint manifold to find out the optimal solution. In the two-dimensional space, the optimal solution may be a single point and its variance. Further, when the data to be fused is three-dimensional, the optimal solution may be defined as a mean vector and fused covariance.

The inverse-whitening transform module 560 may be configured to apply inverse-whitening transform to the produced data. That is, the 2N-dimensional extended space may be transformed into the N-dimensional space. In this way, the produced data may be transformed to the optimal solution for the fused data.

Figure 6:
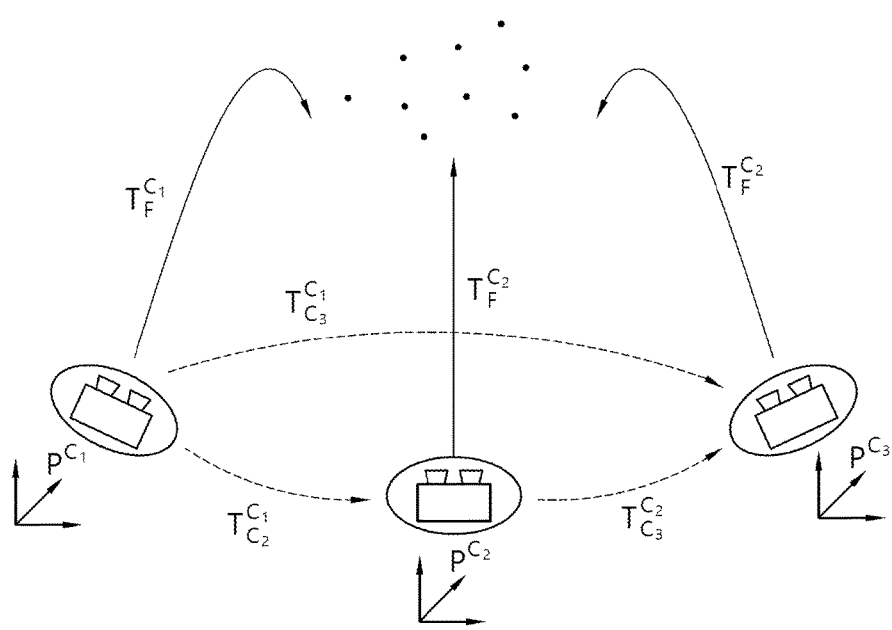
FIG. 6 illustrates a diagram for describing a method for performing a movement optimization of image data from three different measurement positions in accordance with another embodiment of the present invention.

FIG. 6 illustrates a diagram for describing a method for performing a movement optimization of image data from three different measurement positions in accordance with another embodiment of the present invention.

Referring to FIG. 6, different movement estimation data of at least three images imaged by a single sensing device such as a camera or robot vehicle in different positions for a single object may be fused to produce an optimal solution for the device movement. In this connection, the movement may refer to deformation or rotations, etc. of the sensing device. In order to estimate the device movement, a visual odometry (VO) may be employed. This VO may refer to a process for estimating self-movement of the camera or robot vehicle using visual images. When estimating the movement using the VO, there may occur many errors. This error may accumulate as the sensing device move from one point to another point as shown in FIG. 6. Using the VO, a current movement of the sensing device may be calculated by adding movements from subsequent views consequently. That is, a movement from a point 1 to a point 3 should be equal to an accumulation of a first movement from the point 1 to the point 2 and a second movement from the point 2 to the point 3. In other words, a measured pose of an object and a calculated pose at the point 3 for the object may be redundant information for the same scene for the object. In this connection, the redundant information may be fused in accordance with the present data fusing method, to produce a more optimal and less uncertain estimated pose.

Figure 7:
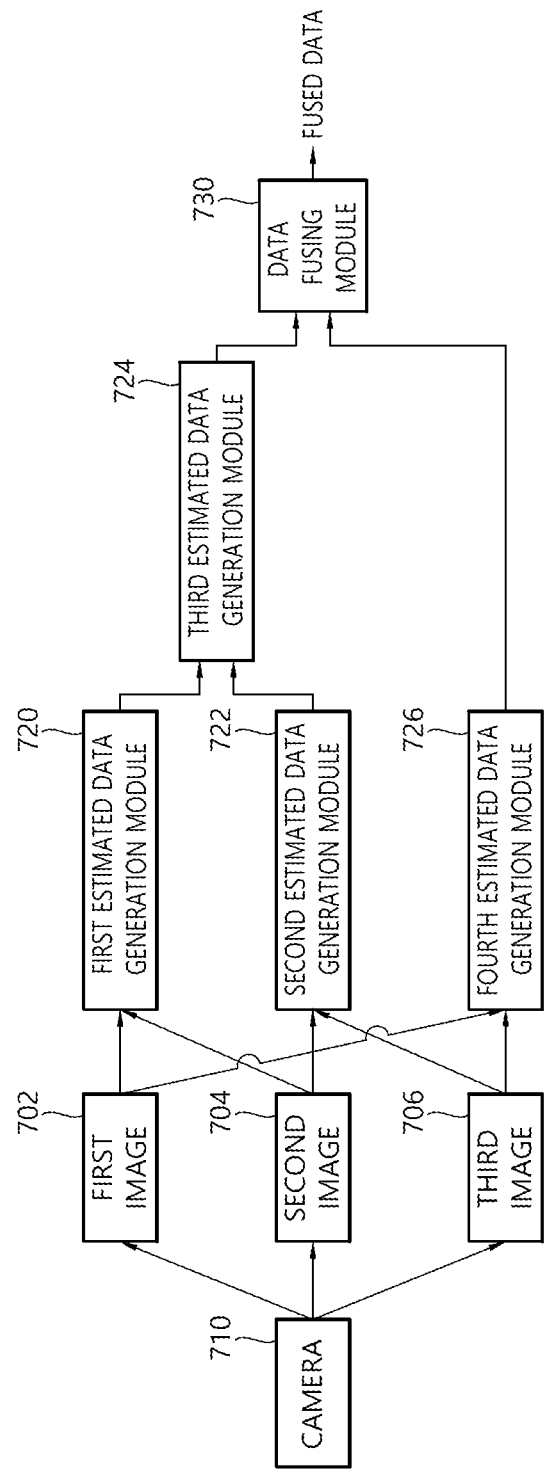
FIG. 7 illustrates a block diagram of a device for performing a movement optimization of image data from three different measurement positions in accordance with another embodiment of the present invention.

FIG. 7 illustrates a block diagram of a device for performing a movement optimization of image data from three different measurement positions in accordance with another embodiment of the present invention. As shown in FIG. 7, the movement optimization device in accordance with one embodiment of the present invention movement optimization may include a camera 710, a first estimated data generation module 720, a second estimated data generation module 722, a third estimated data generation module 724, a fourth estimated data generation module 726 and a data fusing module 730.

Referring to FIG. 7, the camera 710 in movement may be configured to image at least three images including a first image 702, a second image 704 and a third image 706. The images 702, 704, 706 may include a RGB-D sequence. The moving camera 710 may sense the first image 702 at a point 1, the second image 704 at a point 2, and a third image 706 at a point 3 (See FIG. 6). In other words, the point 1, point 2 and point 3 may be associated with the camera position and rotation angle. That is, the point 1, point 2 and point 3 may have different coordinates (x, y, z).

The first estimated data generation module 720 may be configured to receive the first image 702 and second image 704 and then to estimate a first movement of the camera 710 from the point 1 to the point 2 using the VO technique.

The second estimated data generation module 722 may be configured to receive the second image 704 and third image 706 and then to estimate a second movement of the camera 710 from the point 2 to the point 3 using the VO technique.

The third estimated data generation module 724 may be configured to estimate a third movement of the camera 710 from the point 1 to the point 3 using the first and second estimated movement data respectively from the first and second estimated data generation modules 720 and 722.

The fourth estimated data generation module 724 may be configured to receive the first image 702 and third image 706 and then to estimate a fourth movement of the camera 710 from the point 1 to the point 3 using the VO technique.

In theory, the third estimated movement data from the third estimated data generation module 724 and the fourth estimated movement data from the fourth estimated data generation module 726 should be equal to each other. However, the above two data may have different values due to data uncertainty.

Thus, the present data fusing module 730 may be configured to receive and fuse the third estimated movement data from the third estimated data generation module 724 and the fourth estimated movement data from the fourth estimated data generation module 726, to produce a single optimal third movement data.

To this end, the data fusing module 730 may be configured to receive the estimated third and fourth movement data (N-dimensional data), to represent an estimated movement data set in an 2N-dimensional extended space based on the estimated third and fourth movement data (N-dimensional data), and then to apply the whitening transform to the 2N-dimensional extended space including the estimated movement data set. As a result, the estimated movement data set as the elliptical data set in the extended space may be transformed to a circular or spherical data set. Further, a constraint manifold may be transformed to a new constraint manifold based on characteristic of the space. Thereafter, the data fusing module 730 may be configured to perform projection of the circular or spherical data set onto the transformed constraint manifold to produce an optimal solution. Then, the data fusing module 730 may be configured to apply inverse-whitening transform and then to transform the 2N-dimensional space to the N-dimension space, to acquire an optimal solution in the N-dimension space.

The above description is not to be taken in a limiting sense, but is made merely for the purpose of describing the general principles of exemplary embodiments, and many additional embodiments of this disclosure are possible. It is understood that no limitation of the scope of the disclosure is thereby intended. The scope of the disclosure should be determined with reference to the Claims. Reference throughout this specification to "one embodiment," "an embodiment," or similar language means that a particular feature, structure, or characteristic that is described in connection with the embodiment is included in at least one embodiment of the present disclosure. Thus, appearances of the phrases "in one embodiment," "in an embodiment," and similar language throughout this specification may, but do not necessarily, all refer to the same embodiment.

What is claimed is:

1. A method to fuse a plurality of data, the method comprising:
inputting a plurality of N-dimensional uncertain data where N is a natural number other than zero;
representing the inputted plurality of uncertain data in a first form of a data set in a 2N-dimensional extended space;
generating a second form of a data set by applying whitening transform WT to the 2N-dimensional extended space;
acquiring a first point or first vector through a linear projection to a transformed constraint manifold from the second form of the data set; and generating an N-dimensional fused data by applying inverse-whitening transform to the first point or first vector.

2. The method of claim 1, wherein the first point or first vector is a point or vector to allow an Euclidean distance between a center point of the second form of the data set and a point on the transformed constraint manifold to be minimum.

3. The method of claim 1, wherein the plurality of data comprises a mean value and covariance value of measurement data from sensors.

4. The method of claim 3, wherein the first form of the data set is an elliptical data set formed using the mean values and covariance values of the plurality of data.

5. The method of claim 1, wherein the second form of the data set is a circular data set.

6. The method of claim 1, wherein the plurality of uncertain data is measurement data obtained from respective measurement sources to measure a same value.

7. The method of claim 1, wherein the first vector is a mean vector of the fused data.

8. The method of claim 1, further comprising calculating a combined covariance value of the fused data using intersection data between the first form of the data set and the projected transformed constraint manifold.

9. A device to fuse a plurality of data, the device comprising:
a processor configured to:
input a plurality of N-dimensional uncertain data, where N is a natural number other than zero;
represent the inputted plurality of uncertain data in a first form of a data set in a 2N-dimensional extended space;
generate a second form of a data set by applying whitening transform WT to the 2N-dimensional extended space;
acquire a first point or first vector through a linear projection to a transformed constraint manifold from the second form of the data set; and
generate an N-dimensional fused data by applying inverse-whitening transform to the first point or first vector.

10. A method to produce fused data from at least three image data, the method comprising:
generating first estimated data for a movement of a device, based on a first image sensed from the device at a first state and a second image sensed from the device at a second state, the first and second states comprising positions and rotation angles of the device;
generating second estimated data for a movement of the device based on the second image and a third image sensed from the device at a third state;
generating third estimated data for a movement of the device from a first position to a third position, using the first and second estimated data;
generating fourth estimated data for a movement of the device based on the first and third images; and
calculating a fused data between the third and fourth estimated data,
wherein the calculating of the fused data comprises
representing the third and fourth estimated data in a first form of a data set in a 2N-dimensional extended space,
generating a second form of a data set by applying whitening transform WT to the 2N-dimensional extended space,
acquiring a first point or first vector through a linear projection to a transformed constraint manifold from the second form of the data set, and
generating a N-dimensional fused data by applying inverse-whitening transform to the first point or first vector.

11. The method of claim 10, wherein the first estimated data, the second estimated data and the fourth estimated data are estimated using a visual odometry (VO).

12. The method of claim 10, wherein the first point or first vector is a point or vector to allow an Euclidean distance between a center point of the second form of the data set and a point on the transformed constraint manifold to be minimum.

13. The method of claim 10, wherein each of the third and fourth estimated data comprises a mean value and covariance value.

14. The method of claim 13, wherein the first form of the data set is an elliptical data set using the mean values and covariance values of the third and fourth estimated data.

15. The method of claim 10, wherein the second form of the data set is a circular data set.

16. The method of claim 10, wherein the first vector is a mean vector of the fused data.

17. The method of claim 10, further comprising calculating a combined covariance value of the fused data using intersection data between the first form of the data set and the projected transformed constraint manifold.

18. A device to produce a single fused data from at least three image data, the device comprising:
a processor configured to:
generate first estimated data for a movement of a device, based on a first image sensed from the device at a first state and a second image sensed from the device at a second state, the first and second states comprising positions and rotation angles of the device;
generate second estimated data for a movement of the device based on the second image and a third image sensed from the device at a third state;
generate third estimated data for a movement of the device from a first position to a third position, using the first and second estimated data;
generate fourth estimated data for a movement of the device based on the first and third images; and
calculate a fused data between the third and fourth estimated data, the calculating comprising
representing the third and fourth estimated data in a first form of a data set in a 2N-dimensional extended space,
generating a second form of a data set by applying whitening transform WT to the 2N-dimensional extended space,
acquiring a first point or first vector through a linear projection to a transformed constraint manifold from the second form of the data set, and
generating an N-dimensional fused data by applying inverse-whitening transform to the first point or first vector.

* * * * *